Dec. 29, 1964   M. H. CHERIS   3,162,921
ADJUSTABLE CLAMP
Filed April 9, 1963
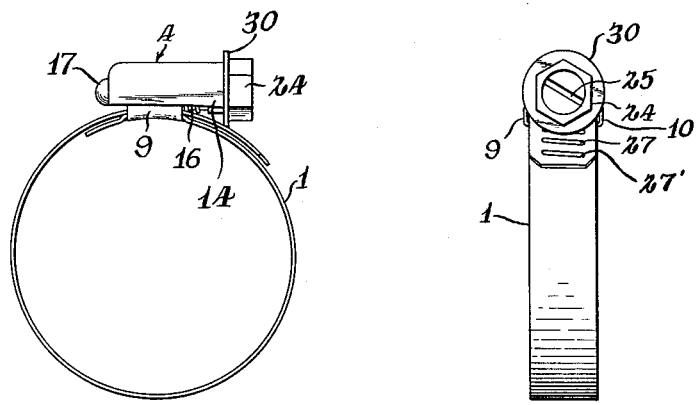
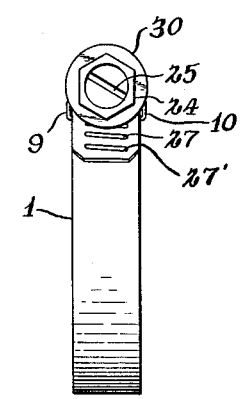
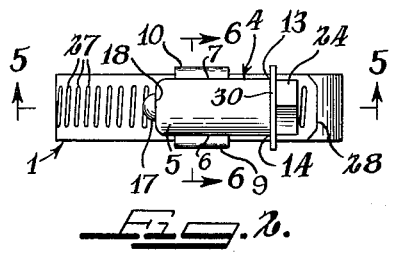
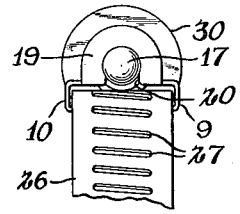
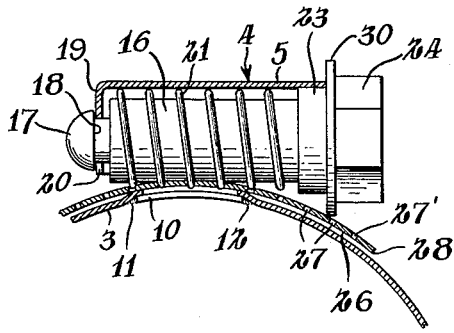
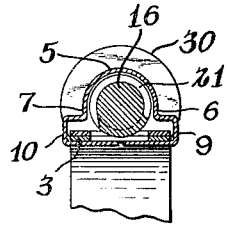
INVENTOR.
MAYNARD H. CHERIS
BY
Fidler, Beardsley, Bradley, Patnaude & Petherbridge
Attys.

United States Patent Office 3,162,921
Patented Dec. 29, 1964

3,162,921
ADJUSTABLE CLAMP
Maynard H. Cheris, Skokie, Ill., assignor to Sterling Automotive Manufacturing Company, Elk Grove Village, Ill., a corporation of Illinois
Filed Apr. 9, 1963, Ser. No. 271,620
2 Claims. (Cl. 24—274)

This invention relates to improvements in adjustable clamps.

It is a primary object of the present invention to provide an improved adjustable clamp of the type used to secure a hose or other flexible tubing to a pipe or similar fitting.

It is also an object of the present invention to provide an adjustable clamp of the type stated which can be used with a wide range of sizes of hose or flexible tubing.

The adjustable clamp of the present invention is of the type which includes a transversely flat clamping band having a housing with a new and improved take-up screw therein located at one end of the band. The other end of the band is slotted over a portion of its length and projects through the housing in overlapping relation to said one end of the band. The take-up screw draws the slotted end through the housing to tighten the clamp around the hose or tubing. The screw is constructed so as to prevent interference of the leading edge of the slotted end of the band with the head of the screw as the slotted end of the band is drawn through the housing, to distribute the thrust of the screw as it is rotated, and to prevent the screw head from spreading the adjacent end of the clamp housing and whereby the screw head would otherwise enter the housing and damage the clamp.

It is a still further object of the present invention to provide a clamp of the above mentioned character wherein the screw can be irremovably mounted in the housing in a simple manner after the housing has been secured to the band, whereby the screw does not interfere with the operations of securing the housing to the band.

It is another object of the present invention to provide an adjustable clamp of the type stated in which the take-up screw has a washer head and an annular groove cooperating with the housing for limiting the axial shifting of the screw in both directions and for absorbing the axial thrust of the screw, thereby simplifying the construction of the housing and assembly of the take-up screw therewith.

The attainment of the above and further objects of the present invention will be apparent from the following specification taken in conjunction with the accompanying drawing forming a part thereof.

In the drawing:

FIG. 1 is a side view in elevation of an adjustable clamp constructed in accordance with and embodying the present invention;

FIG. 2 is a top view in elevation of the clamp of FIG. 1;

FIG. 3 is a rear view in elevation of the clamp of FIG. 1;

FIG. 4 is an enlarged fragmentary view in front elevation of the clamp of FIG. 1;

FIG. 5 is an enlarged fragmentary view in partial section taken along line 5—5 of FIG. 2, and, FIG. 6 is an enlarged fragmentary view in partial section taken along line 6—6 of FIG. 2.

Like reference numerals and characters designate like parts throughout the drawings.

Referring now in more detail to the drawing which illustrates a preferred embodiment of the present invention, A designates an adjustable clamp comprising a continuous narrow arcuate, transversely flat band 1 of spring steel or the like which is adapted to encircle a hose or other flexible tubing (not shown). Secured to the band 1 adjacent to an end 3 thereof is a hollow sheet metal housing 4 which has a substantially semi-cylindrical top 5 and spaced substantially parallel depending sides 6, 7, the latter terminating adjacent to the forward end of the housing in U-shaped mounting members 9, 10. The mounting members 9, 10 embrace the longitudinal margins of the band 1 and are permanently secured to the inside of the band 1 as, for example, by welds 11, 12. Rearwardly of the mounting members 9, 10 the sides 6, 7 extend longitudinally and terminate in parallel edges 13, 14.

Rotatably mounted in the housing is an adjusting or take-up worm screw 16, the longitudinal axis of which extends in a direction generally longitudinally of the band 1. The tip 17 of the screw 16 is approximately semi-spherical in shape and adjacent to the tip 17 the screw 16 is formed with a diametrally reduced annular groove 18. The housing 4 includes an end wall 19 formed with a slot 20 into which the screw fits with the end wall 19 at the slot lying within the groove 18. Thus the end wall 19 takes the axial thrust of the screw 16 in both directions.

The screw also has a shank provided with a spiral thread 21 which lies within the housing 4, and the screw also includes a cylindrical portion 23 which is adapted to bear against the inside of the top 5. An enlarged screw head 24 lies adjacent to the portion 23 and exteriorly of the housing and has a screwdriver slot 25. The head 24 is of a minimum transverse dimension slightly larger than the exterior diameter of the top 5. Between the portion 23 and head 24 is fixedly carried an annular thrust collar 30 which is located exteriorly of the housing and which is of a diameter greater than the maximum transverse dimension of the head 24 of the screw 16. The collar 30 is the collar or flange of what is known in the trade as a "hex washer head" screw. The collar radiates from the axis of the screw a sufficient distance so that it engages the end 26 of the band and continuously urges the end 26 away from the screw head 24 and thus prevents binding or jamming of the screw head during threading of the screw 16. In addition, as the diameter of the band 1 is decreased by threading of the screw, the collar 30 distributes stresses from the screw 16 to the housing and thus cooperates with the shoulders provided by the groove 18 to distribute such stresses. It has also been observed that with use of conventional screws, the head of the screw tends to act on the open end, when the screw is under stress of the housing to flare the end defining portion of the housing outwardly from the longitudinal axis of the housing thereby causing the head 24 to enter the housing with the result that the housing is distended and the clamp is useless thereafter. A feature of the present invention resides in the employment of the collar 30 which will prevent the screw head 24 from entering the housing under such circumstances and which will tend to prevent the end portion of the housing adjacent the collar from so flaring outwardly.

The opposite end 26 of the band 1 is formed with a pluraltiy of uniformly spaced parallel slots 27 which extend transversely of the band and are inclined to the longitudinal center line of the band is constitute worm grooves. These slots 27 extend over a portion of the length of the band 1. The sides 6, 7 of the housing 4 are spaced from the band 1 at the end 3 thereof a distance sufficient to provide clearance for insertion of the band end 26 into the housing in overlapping relation to the end 3, as shown in FIG. 5, after the band 1 has been placed around the tube or hose with which it is being used. When the end 26 is inserted into the housing, the screw 16 may be rotated in one direction causing the spiral thread 21 to project into the slots 27. Continued rotation of the screw 16 will draw the end 26 through the housing (i.e. to the right, FIG. 2) to decrease the diametral size of the band 1, thereby tightening the clamp around the hose or tubing. It will be apparent that reverse rotation of the screw 16 will shift the end 26 to the left (FIG. 5) until the endmost slot 27' clears the thread 21, whereupon the ends 3, 26 may be spread apart to permit removal of the clamp A from the hose upon which it was mounted.

Since the band 1 is made of spring steel there is a tendency for the end 26 of the band to flex in a direction toward the collar 23 and head 24 of the screw with the result that the leading edge 28 of the band end 3 has a tendency to jam against the head 24 or collar 23. However, as the end 26 is drawn through the housing it will bear against the screw collar 30 which urges the band edge 28 from the screw head so that the edge 28 will be guided away from the screw head 24, thus preventing the edge 28 from binding or jamming against either the collar 23 or head 24. The collar 30 may have a thickness equal to the width of the slots 27 and, thus, may cooperate with the thread 21 to draw the end 26 of the band through the housing by projection into the slots 27.

In the manufacture of the clamp A, the housing 4 is formed substantially to the shape illustrated and is welded in place at the band end 3. Thereafter, the screw 16 is inserted axially into the housing to force the tip 17 through the slot 20. The width of the slot is such that the end wall 19 in the region of the slot 20 will flare outwardly within elastic limits to allow the tip 17 to pass through the slot 20 but will return substantially to its original shape and seat within the groove 18. If the end wall 19 should accidentally become distorted as a result of this operation, it can be easily worked to shape it properly.

Although, various minor modifications and alterations of the present invention will be readily apparent to those versed in the art, it should be understood that what is desired to be embodied within the scope of the patent warranted hereon, are all such embodiments as reasonably and properly fall within the scope of the contribution to the art hereby made.

I claim:

1. An adjustable hose clamp comprising a narrow arcuate band of resilient material, said band having uniformly spaced parallel slots extending transversely thereof, said slots commencing at one end and extending throughout a portion of the band, said slot lying at an angle other than a right angle to the longitudinal center line of the band, a housing having a transverse entirely open end and an opposite transverse walled end secured to the other end of the band, a screw rotatably mounted in the housing and being on the radially outermost side of the band with the longitudinal axis of the screw extending in a direction generally longitudinally of the band, said screw having a threaded shank within the housing and a diametrally enlarged head lying exteriorly of the housing at the open end thereof remote from the other end, said one end of the band being insertable through said housing in overlapping relationship with said other end of the band on the radially outermost side thereof and with the threads on the screw shank projecting into said slots to form a closed loop which, upon rotation of said screw in one direction, draws said one end completely through said housing and past the screw head and decreases the size of the loop, said screw having a fixed annular flange having an edge presented toward said overlapping one end of the band and lying substantially in a plane which is at a right angle to the longitudinal axis of the screw, said edge being of substantially the same thickness as the width of said slots and normally abuttingly contacting said overlapping one end of the band so as to ride along the edges of said slots to cooperate with said screw to facilitate drawing of said overlapping one end through said housing.

2. A hose clamp screw assembly comprising a hose band having an overlapping one end, angularly arranged parallel slots in said overlapping one end, a housing having a transverse entirely open end and an opposite transverse walled end secured to the other end of the band, said walled end having a notch, a screw rotatably journalled in said notch and mounted partially within the housing and being one the radially outermost side of the band with the longitudinal axis of the screw extending in a direction generally longitudinally of the band, said screw having threads pitched so as to cooperate with said angularly arranged slots in the overlapping end of said band for tightening same, said screw having a fixed annular flange exterior of the housing abutting sides of the housing on said open end thereof, said annular flange having an edge presented toward said overlapping one end of the band and lying substantially in a plane which is at a right angle to the longitudinal axis of the screw, said edge being of substantially the same thickness as the width of said slots and normally abuttingly contacting said overlapping one end of the band so as to ride along the edges of said slots to cooperate with said screw to facilitate drawing of said overlapping one end through said housing.

References Cited by the Examiner

UNITED STATES PATENTS

| 1,397,508 | 11/21 | Gillet | 24—274 |
| 2,487,296 | 11/49 | Bergstrom | 24—274 |
| 2,730,782 | 1/56 | Ludwinski | 24—274 |
| 2,838,821 | 6/58 | Shur | 24—217 |
| 2,940,150 | 6/60 | Rizzo | 24—274 |
| 3,028,650 | 4/62 | Tinsley | 24—274 |
| 3,100,327 | 8/63 | Spector | 24—274 |

FOREIGN PATENTS

| 1,008,485 | 2/52 | France. |
| 567,505 | 2/45 | Great Britain. |
| 589,431 | 6/47 | Great Britain. |
| 157,112 | of/04 | Germany. |

DONLEY J. STOCKING, *Primary Examiner.*